United States Patent [19]

Matkan

[11] E Re. 28,765

[45] Reissued Apr. 13, 1976

[54] LIQUID TONER APPLICATOR

[75] Inventor: Josef Matkan, Malvern, Australia

[73] Assignee: Canon Kabushiki Kaisha, Tokyo, Japan

[22] Aug. 13, 1975

[21] Appl. No.: 604,191

Related U.S. Patent Documents

Reissue of:

[64] Patent No.: 3,752,119
Issued: Aug. 14, 1973
Appl. No.: 151,843
Filed: June 10, 1971

[30] Foreign Application Priority Data

June 11, 1970 Australia.....1483

[52] U.S. Cl......118/637; 118/410; 118/DIG. 23; 427/17

[51] Int. Cl.[2].....G03G 15/10

[58] Field of Search.....118/637, 410, DIG. 23; 355/10, 3P; 427/15, 17

[56] References Cited

UNITED STATES PATENTS

| | | | |
|---|---|---|---|
| 3,711,796 | 1/1973 | Saito et al. | 355/10 |
| 3,561,400 | 2/1971 | Smitzer et al. | 118/637 |
| 3,605,692 | 9/1971 | Maloney et al. | 118/637 |
| 3,557,752 | 1/1971 | Hakanson | 118/637 |
| 3,507,252 | 4/1970 | Leedom | 118/637 |
| 3,651,782 | 3/1972 | MacDonald, Jr. | 118/637 |
| 3,727,578 | 4/1973 | Saito et al. | 118/637 |
| 3,664,298 | 5/1972 | Giaimo, Jr. | 118/637 |
| 3,263,649 | 8/1966 | Heyl et al. | 118/637 |
| 3,334,613 | 8/1967 | Young | 118/637 |
| 3,407,786 | 10/1968 | Beyer et al. | 118/637 |

*Primary Examiner*—Mervin Stein
*Assistant Examiner*—Douglas Salser
*Attorney, Agent, or Firm*—Fitzpatrick, Cella, Harper & Scinto

[57] ABSTRACT

A means for developing electrostatic latent images using liquid dispersed toners, using a distributor mounted in a substantially horizontal position and having disposed in it exit means whereby dispersed toner fed into the distributor is moved to form a pool in an area above the distributor in which the distributor and side plates are positioned in relation to the surface bearing the electrostatic latent image to be developed so that the pool of liquid dispersed toner touches the image bearing surface without direct stream impingement on the surface being developed.

12 Claims, 8 Drawing Figures

LIQUID TONER APPLICATOR

BACKGROUND OF THE INVENTION

This invention relates to improvements in electrophotography and electrostatic printing, and in particular relates to a developing apparatus whereby a surface to be developed may be maintained in accurately controlled immersion within a body of liquid dispersed toner.

Various mechanisms are known whereby a surface carrying an electrostatic latent image may be contacted with a liquid developer, which liquid developer normally comprises a pigment or other marking particle dispersed in a carrier liquid, characterised by such carrier liquid having a volume resistivity in excess of $10^9$ ohm-cm and dielectric constant less than three. Such liquid developers may also contain resins or oils or other materials incorporated with the marking particles, such additives being the well known polarity control agents, fixing agents, dispersing agents and the like. The marking particles, together with additives which deposit to form the developed image are referred to generally as toners, and thus a liquid developer consists essentially of electrostatically attractable toner particles in suspension in a carrier liquid.

The simplest of the various applicator mechanisms used for applying toners from liquid suspensions are immersion baths, such as are commonly used in office copying machines and the like, which usually suffer from the disadvantage that they are bulky and of relatively slow developing action. In addition such immersion systems are normally open, and thus subject to spillage of developer liquid if moved.

Other mechanisms which have been used include roller assemblies, in which the recording member to be developed is fed in proximity to a roller or series of rollers wetted with dispersed toner. Such roller assemblies may give rise to a developing defect commonly referred to as ghosting, which may occur because of local denudation of toner particles from the film of developer carried by the roller, or may be caused by deposition of toner material in pattern form on the roller surface, which deposit adversely influences the biasing action of the developing roller.

Still further mechanisms involve the use of jets or the like directed towards the surface to be developed, the developer being pumped to the jets and caused to impinge on the surface being developed. Such mechanisms may produce local underdeveloped areas at the point of contact of the jet with the surface due to the scouring action of the relatively high velocity directional stream of developer.

SUMMARY OF INVENTION

This present invention relates to a means whereby these various disadvantages of the prior art mechanisms referred to may be overcome, while retaining the advantages of providing a fast but uniform developing action in a relatively small space, and which may if desired be arranged to contain the toner dispersion of a closed container excepting when the equipment is in operation, thus allowing transport of the equipment without the risk of spillage of liquid dispersed toner.

Thus the present invention is in effect an immersion device in which dispersed toner is fed to a developing station through a distributing system so as to achieve a particular pool contact with the image being developed without direct contact by streams which could by excessive washing action or turbulence disturb image deposition, excess dispersion being returned to a reservoir.

The invention thus consists essentially of a distributor mounted in a substantially horizontal position and having disposed along its upper face exit means whereby dispersed toner fed into said distributor is moved to form a pool in an area above said distributor, side plates being associated with the distribution to maintain the said pool in position, the distributor and said plates being however so positioned in relation to the surface bearing the electrostatic latent image to be developed that the pool of liquid dispersed toner has a height such that it touches said image bearing surface without direct flow streams from the distributor impinging on the surface being developed. Control of the height of the developer pool formed above the distributor can be done by use of end plates selected in relation to the rate of flow of liquid to the pool.

BRIEF DESCRIPTION OF THE DRAWINGS

In order that the invention may be more readily understood it will be described in terms of the illustrations, in which.

DESCRIPTION OF THE PREFERRED EMBODIMENT

Figure 1:
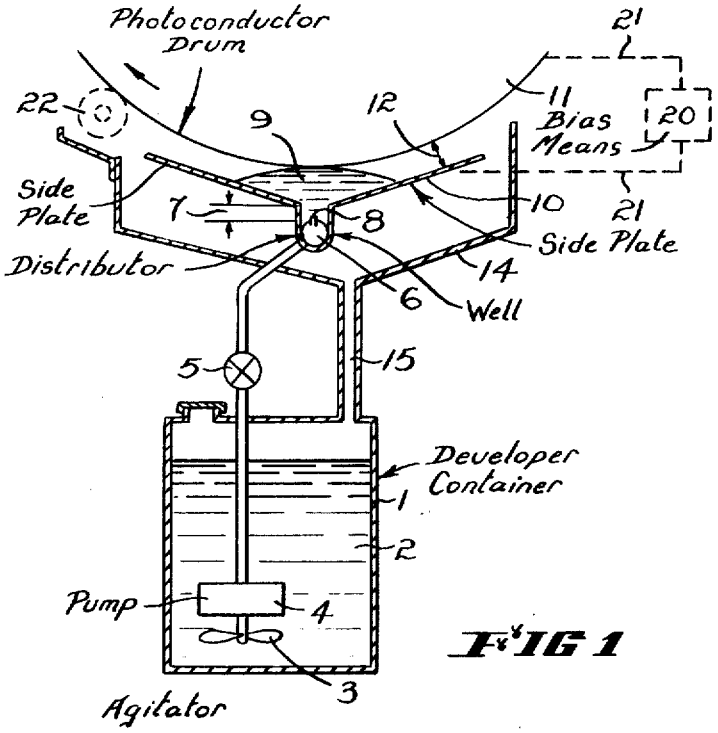
FIG. 1 illustrates a desired system incorporating the developing station of the present invention.

Referring to FIG. 1 in detail, a container 1 contains a liquid dispersed toner 2, which toner may be maintained in suspension when necessary by use of the impeller 3. In use the toner suspension is pumped by the pump 4 through the regulating valve 5 to the distributor 6.

The distributor 6 conveys toner dispersion to an area immediately above it which is designated 7, and which forms a liquid guiding well, the dimensions of this being so selected in relation to liquid flow and the diameter and shape of the orifices 8 to eliminate substantially the directional flow characteristics of the toner dispersion introduced by the shape and dimensions of the orifices 8 in the distributor 6. The orifices can normally be one-eighth inch in diameter or greater but may be less in those instances where an exceptionally low developer flow rate is found to be desirable or required.

The dispersed toner forms a pool 9, contained by the well and side plates 10, the top surface of this pool of dispersed toner 9 touching the surface to be developed, which surface is carried on a drum 11. It will be ealised that drum 11 may have on its surface a layer of permanent photoconductor or may alternatively be a carrier member for a web or individual sheets of electrophotographic or electrographic recording nembers as required in any particular instance. The area of contact of the toner dispersion and the nember being developed may be varied by varying the width of gap 12 between the side plate 10 and drum 11, and in addition further control of this contact area may be achieved by regulating the dispersed toner flow rate using the regulator valve 5. Unused dispersed toner overflows at the ends of the holding member and drops into the collector 14, to be returned to the container 1 through the pipe 15.

Figure 2:
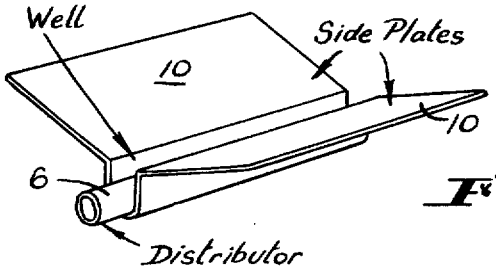
FIGS. 2 and 3 illustrate alternative forms of the overflow device which contains the liquid dispersed toner at the developing site.

FIG. 2 is an isometric view of the developer applicator of FIG. 1, showing the distributor 6 and side plates 10, the ends of the unit being open in this configuration.

Figure 3:
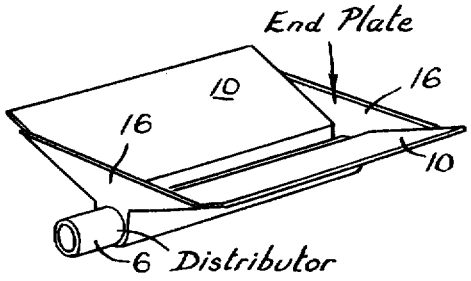

In FIG. 3 is shown an optional alternative configuration, using similar reference numerals for corresponding parts, in which end plates 16 are used to increase the depth of the contained dispersion toner pool.

Figure 4:
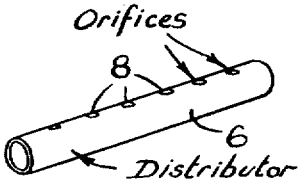
FIGS. 4 and 5 illustrate alternative forms of the distributor.

FIG. 4 is an isometric view of the distributor 6, showing in particular how the dispersed developer 2 passes through multiple orifices 8 to form the developing pool 9 indicated in FIG. 1.

Figure 5:
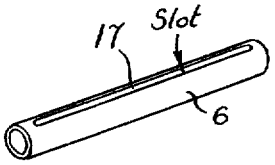

In FIG. 5 is shown a variation in which the individual orifices of the distributor 6 are replaced with a continuous slot 17. It will be realised that the toner dispersion can be fed into the distributor 6 through either end or both ends, or at the centre, or at any other point as desired.

Figure 6:
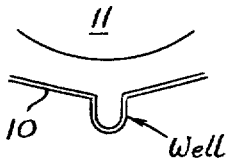
FIGS. 6 and 7 illustrate alternative forms of the side plates of the overflow device and FIG. 8 shows a baffled liquid distributor.
Figure 7:
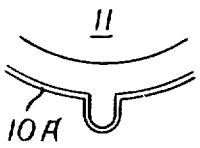

FIGS. 6 and 7 show alternative shapes for side plate 10, FIG. 6 showing these as substantially flat in accordance with FIG. 1 while FIG. 7 shows curved plates 10A substantially parallel with the surface of drum 11.

Figure 8:
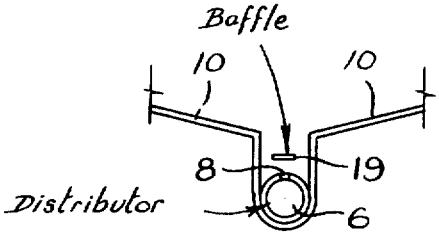

Further modifications which may be introduced without departing from the spirit of this invention include the incorporation of a baffle above orifices 8 or slot to further reduce the directional flow characteristics associated with the orifice 8 or slot which may also allow the distance 7 to be reduced. Such a form is shown in FIG. 8 where the baffle is designated 19 and serves further to ensure that there are no direct streams from the orifices 8 in the distributor 5 which could impinge on the photoconductor surface to cause excessive washing action thereby damaging the image.

Further, the developing unit 6, 10, 14 and 16 may be insulated from ground if desired in order that a bias voltage can be applied to the side plates 10 to further control development, such an arrangement being indicated in dotted lines in FIG. 1 wherein 20 represents a bias voltage supply device, and 21 are the feed leads to the plates 10 and drum 11, and in addition squeegee rollers or other means may also be included to limit the carry out of carrier liquid without departing from the essential features of this invention. A squeegee roller is shown dotted in FIG. 1 and designated 22.

It will be realised that this present invention has the advantage of applying constantly agitated dispersed toner containing marking particles in such manner that at the site of image development the marking particles are constantly replenished uniformly over the full length of the image area without over or under concentration in localised areas due to the flow pattern, further characterised in that this present invention eliminates disturbance of developed image deposits by direct impingement of liquid in the imaging areas as flow pattern cancellation and equalisation take place substantially below the surface to be developed.

Having thus described my invention, what I claim is:

1. Apparatus for developing electrostatic latent images comprising, in combination, a container for containing a liquid dispersed toner, agitation means mounted in said container for maintaining said toner in suspension, a collector mounted above said container, return means interconnecting the bottom of said collector with said container in fluid flow communication, a pair of sheet-like side plates mounted, in V-shaped relationship with respect to each other, in said collector; an elongated U-shaped well interconnecting the adjacent side edges of said side plates, an elongated tube-shaped distributor mounted in said elongated well having upwardly directed openings therein, pump means mounted in said container, means interconnecting said pump means and said distributor in fluid flow communication, said last named means including a regulating valve for controlling the fluid flow to said distributor, said side plates and said well being mounted to coact to form a pool having a top surface which touches a surface to be developed carried on a drum.

2. Apparatus for developing electrostatic latent images according to claim 1 further comprising end plates connecting the end edges of said side plates, respectively, to coact with said side plates to form a pool having a top surface which touches a surface to be developed carried on a drum.

3. Apparatus for developing electrostatic latent images according to claim 1 wherein said side plates are substantially planar.

4. Apparatus for developing electrostatic latent images according to claim 1 wherein said side plates are outwardly, upwardly, contoured.

5. Apparatus for developing electrostatic latent images according to claim 1, further comprising a baffle mounted in said well overlying said openings and being disposed in spaced relationship with respect thereto.

*6. Apparatus for developing electrostatic latent images comprising, in combination, a drum having a surface thereon for carrying an electrostatic latent image to be developed, a container for containing a liquid dispersed toner, agitation means mounted for maintaining said toner in suspension in said container, a pair of side plates mounted relative to said drum, means defining an elongated well extending along and interconnecting the said side plates and opening between said side plates, an elongated distributor mounted to extend along said elongated well and having openings therealong opening into said well, pump means, means connecting said pump means between said container and said distributor to supply liquid dispersed toner from said container to said distributor, said side plates and said elongated well being mounted to coact to form a pool of liquid dispersed toner having a top surface which touches the surface of said drum.*

*7. Apparatus for developing electrostatic latent*

*images according to claim 6 wherein said pump means is mounted in said container.*

*8. Apparatus for developing electrostatic latent images according to claim 6 further comprising a roller for removing excess liquid toner.*

*9. Apparatus for developing electrostatic latent images according to claim 6 wherein said side plates are of curved form, substantially parallel with said drum.*

*10. Apparatus for developing electrostatic latent images according to claim 6 characterized by baffle means beyond said openings of said elongated distributor to reduce the directional fluid flow characteristics associated with said openings.*

*11. Apparatus for developing electrostatic latent images according to claim 6 further comprising end plates connecting the end edges of said side plates, respectively, to coact with said side plates to form said pool.*

*12. Apparatus for developing electrostatic latent images according to claim 6 wherein said means connecting said pump means between said container and said distributor includes a regulating valve for controlling the fluid flow to said distributor.*

* * * * *